(No Model.) 2 Sheets—Sheet 1.
A. J. & W. H. CURTIS.
MACHINE FOR SLICING FRUIT.
No. 503,903. Patented Aug. 22, 1893.
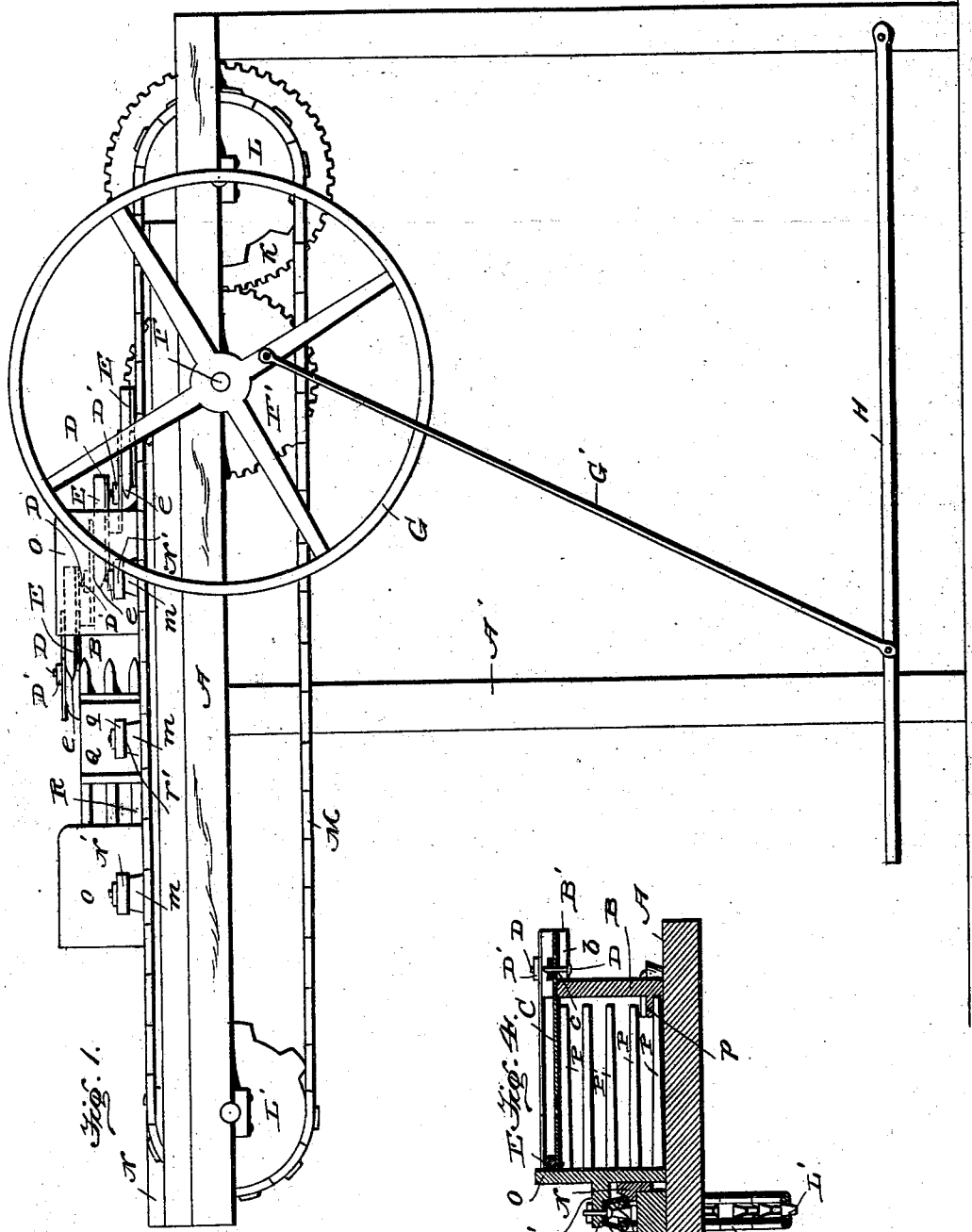
Witnesses:
Wm C Ashieu
Arthur F Bryant
Inventors
A. J. & W. H. Curtis.
Edson Bro's,
Atty's.

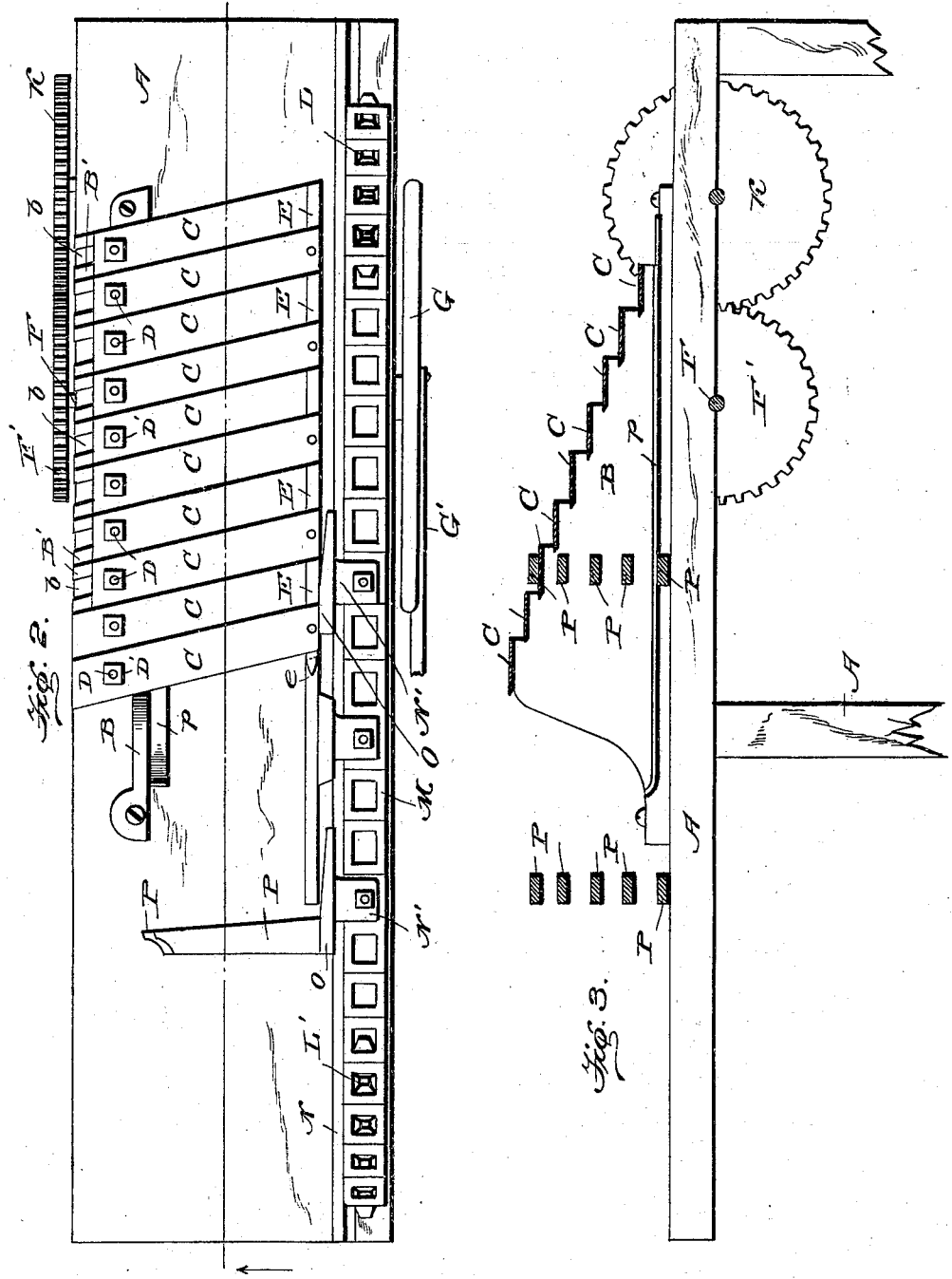

UNITED STATES PATENT OFFICE.

ANDREW J. CURTIS, OF EAST WILLIAMSON, AND WARNER H. CURTIS, OF SODUS, ASSIGNORS OF ONE-THIRD TO G. ARTHUR SCULLEN, OF EAST WILLIAMSON, NEW YORK.

MACHINE FOR SLICING FRUIT.

SPECIFICATION forming part of Letters Patent No. 503,903, dated August 22, 1893.

Application filed February 15, 1893. Serial No. 462,426. (No model.)

*To all whom it may concern:*

Be it known that we, ANDREW J. CURTIS, residing at East Williamson, and WARNER H. CURTIS, residing at Sodus, in the county of Wayne and State of New York, citizens of the United States, have invented certain new and useful Improvements in Machines for Slicing Fruit; and we do hereby declare the following to be a full, clear, and exact description of the invention, such as will enable others skilled in the art to which it appertains to make and use the same.

Our invention relates to improvements in fruit slicing machines of that class in which the fruit is carried or forced against stationary knives or cutters.

Our improvements are particularly designed for the preparation of "evaporated apples" and the main object of the invention is to prevent breaking or chipping of the edges of the slices as is commonly the case when using machines of the character commonly employed.

A further object of our invention is to provide means whereby the cut slices will not fall in a solid mass but will be separated thereby facilitating and reducing the labor of placing them on the drying racks.

With these ends in view our invention consists in the peculiar construction and arrangement of parts as will be hereinafter more fully pointed out and claimed.

In the accompanying drawings—Figure 1 is a side elevation of our improved slicing machine. Fig. 2 is a plan view thereof. Fig. 3 is a longitudinal, vertical, sectional view; and Fig. 4 is a transverse, vertical, sectional view.

Like letters of reference denote corresponding parts in all the figures of the drawings, referring to which—

A designates a horizontal solid imperforate table or stand top which is securely mounted on a suitable supporting frame A'. To the top A is securely fastened a triangular shaped knife or cutter supporting plate, B, which plate is provided with a series of laterally projecting lugs B'. The lugs B' are preferably cast integral with the plate B and form a series of regularly ascending steps, the distance between the steps being equal to the thickness of the lugs.

C designates the stationary knives or cutting blades which are detachably attached to the horizontally extending lugs, B', by means of through bolts, D, which are fitted in aligned slots *b*, *c*, formed in the lugs and cutting blades, and held in place by suitable nuts D'. The knives or cutters preferably extend obliquely across the top A and the free ends thereof are firmly attached to connecting plates or strips E. As shown in the drawings, the cutting blades are arranged in pairs, the members of each pair being firmly attached to opposite sides of one of the plates, E, by rivets or other suitable means. The plates, E, are made slightly longer than the width of each pair of cutting blades and they project or extend rearwardly from the blades and terminate in sharp points or spurs *e*.

In bearings attached to the frame A' is journaled a transverse horizontal driving shaft F, to one end of which is secured a pinion F' and to the other end of said shaft is secured a driving wheel G. To one arm or spoke of the wheel G is attached one end of a connecting rod G', the other end of said rod being attached to a treadle H fulcrumed to the frame A'. The pinion F' meshes with a cog or toothed wheel K secured on one end of a horizontal shaft journaled in suitable bearings and on said shaft is also secured a sprocket L. On a shaft journaled in bearings near the opposite end of the machine from the shaft carrying the sprocket L is secured a sprocket L' and the two sprockets L, L', are connected by an endless chain M, which chain bears against a rail N which is attached to the upper surface of the top A beyond the free ends of the knives or cutters C. The chain M is provided throughout its length, at regular intervals, with aligned vertical lugs or plates *m* which are connected at their outer ends by a transverse connecting plate *m'*. The lugs, *m*, and plate *m'* are preferably cast integral with the links composing the chain M. To each of the plates, *m'*, connecting the aligned lugs, *m*, is detachably connected, preferably by means of a bolt, a laterally projecting lug N' cast integral with or otherwise rigidly attached to a vertical plate O, which is provided on its opposite face with a series of parallel horizontal pusher fingers P adapted to pass between each pair of the cutting blades or knives as they are moved longitudinally of the table by the chain M.

Pusher fingers, P, are attached to the chain M in the manner just described, at regular intervals throughout its length and to said chain, between the plates, O, are attached guide blocks Q. The guide blocks Q are preferably provided with laterally projecting lugs $q$ which are connected by a suitable bolt with a cross plate $r'$ cast integral with one of the links of the chain M in a manner similar to that in which the plates carrying the pusher fingers are connected to said chain. The guide blocks Q are provided with a series of parallel longitudinal guide fingers R which lie in the same horizontal planes as, and align with the pusher fingers, P. The guide fingers R extend beyond the front and rear edges of the guide blocks and the rearwardly extending portions of such fingers extend across the inner face of the next plate O. The lower one of each series of pusher fingers, P, is made of greater length than the rest of said fingers and as said fingers are passing through the cutting blades or knives such lower finger extends under a flange $p$ formed integral with and extending longitudinally of the inner face of the plate B.

The operation of our invention is as follows: The fruit to be sliced is placed on the table in rear of the knives or cutters and in advance of one set of pusher-fingers, P. As the chain M is driven by the sprockets, L, L', the pusher fingers and guide fingers are carried forward and the fruit in front of the pusher fingers is forced through the cutters or knives and cut into slices of a thickness corresponding to the distance between the knives or cutters. The guide fingers R are spaced apart so as to pass between each pair of the knives or cutters and prevent the vertical movement of said plates while the fruit is being forced through the same. The pusher fingers pass over the surface of each alternate knife or cutting blade and operate to force the cut slices therefrom. The plates to which the pusher fingers are attached and the guide blocks pass between the ends of the knives or the cutters and the rail on the top A over which the chain M passes, and as the guide fingers R are among the knives all the time the fruit is being forced therethrough, there is no danger of the knives being depressed so as to be struck by the pusher fingers and broken.

If desired a feed hopper of any desired size and style may be arranged above the table A in rear of the knives or cutters and from which the fruit to be sliced can pass into position in front of each set of pusher fingers as they are successively brought into proper position by the movement of the chain M.

It will thus be seen that we have provided a simple, strong and easily operated machine for the purpose specified. If desired any pair of knives or cutters can be readily removed and the guide blocks and plates carrying the pusher fingers can be easily detached from the endless driving chain. The forward ends of the guide fingers are beveled or tapered so as to pass freely under the rear pointed or beveled ends of the plates E.

We are aware that changes in the form and proportion of parts and details of construction of the devices herein shown and described as an embodiment of our invention, can be made without departing from the spirit or sacrificing the advantages thereof, and we therefore reserve the right to make such changes and alterations as fairly fall within the scope of the same. For example, instead of mounting the knives or cutters on a solid stationary table, as herein shown and described, such knives may be supported on a suitable frame and the fruit support moved longitudinally below the same; or a belt substituted for the chain M.

Having thus fully described our invention, what we claim as new, and desire to secure by Letters Patent, is—

1. In a machine of the character described, the combination with a stationary support, of a series of horizontally extending stepped knives carried by the support, and a series of pusher fingers adapted to pass between the stepped knives, substantially as described.

2. In a machine of the character described, the combination with a stationary support, of a series of stationary parallel knives, an endless chain passing around sprockets arranged on opposite sides of the knives, a series of laterally extending pusher fingers carried by the chain and adapted to pass between the knives, and means for driving the endless chain, substantially as described.

3. In a machine of the character described, the combination of a stationary table, a series of parallel knives or cutting blades arranged above the support, an endless chain passing around sprockets arranged in front and in rear of the knives, a series of plates carried by said chain and each provided with a series of projecting pusher fingers adapted to pass between the knives, and means for driving the sprocket chain, substantially as described.

4. In a machine of the character described, the combination of a stationary solid table or support, a plate rigidly secured to said table and decreasing in height from its rear to its forward end, a series of parallel horizontal knives attached at one end to the incline side of said plate, and a series of pusher fingers adapted to be moved longitudinally of the table and pass between the knives or cutters, substantially as described.

5. In a machine of the character described, the combination of a table or support, a triangular plate secured on said table, a series of horizontal parallel knives or cutting blades attached to the inclined side of the triangular plate, plates connecting the free ends of adjacent knives, pusher fingers supported on an endless belt or chain and adapted to pass through the spaces between the connected pairs of knives, and means for driving the endless belt or chain, substantially as described.

6. In a machine of the character described, the combination, of a table or support, a series of knives arranged in pairs, a series of pusher fingers carried by an endless chain or belt and adapted to pass between the pairs of knives, guide blocks attached to the chain or belt, between the pusher fingers thereon, and having fingers also adapted to pass between the pairs of knives, and means for driving the endless chain or belt, substantially as and for the purpose described.

7. In a machine of the character described, the combination of a table or support, a series of knives attached at one end to a stationary plate, plates connecting the outer ends of adjacent knives, a series of plates attached to an endless belt or chain and each having a series of laterally projecting pusher fingers spaced apart sufficiently to pass between the pairs of knives, guide blocks attached to the endless chain or belt, at points between the plates carrying the pusher fingers, and each carrying a series of longitudinal guide fingers adapted to extend between each pair of knives and support the free ends thereof as the pusher fingers are passing between the same, substantially as described.

8. In a machine of the character described, the combination of a table or support, a triangular shaped plate secured to said table and provided with a series of laterally projecting lugs which lie in different horizontal planes, knives or cutting blades detachably connected at one end to said lugs and extending obliquely across the table, plates connecting the outer free ends of adjacent knives, an endless chain or belt arranged beyond the free ends of the knives, plates attached to said chain or belt and each having on its inner side a series of horizontally extending parallel pusher arms adapted to pass between the pairs of knives, and guide blocks attached to the chain, at points between the plates carrying the pusher fingers, and having guide fingers which align with the pusher fingers, and means for driving the endless belt or chain, substantially as and for the purpose described.

9. In a machine of the character described, the combination, of a table or support, a series of stationary cutting blades supported above said table, a sprocket chain passing around aligned sprockets secured on suitable shafts, means for driving said chain, a series of plates each provided on one face with a laterally projecting lug, which is connected to lugs on the driving chain, and on its other face with pusher fingers adapted to pass between the knives or cutters, substantially as described.

In testimony whereof we affix our signatures in presence of two witnesses.

ANDREW J. CURTIS.
    WARNER H. CURTIS.

Witnesses:
  E. W. KELLY,
  GEORGE WOOD.